(12) United States Patent
Kurian et al.

(10) Patent No.: US 10,397,970 B2
(45) Date of Patent: Aug. 27, 2019

(54) NEIGHBOR AWARENESS NETWORKING TREE MAPPING

(71) Applicant: Apple Inc., Cupertino, CA (US)

(72) Inventors: Lawrie Kurian, San Jose, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 15/241,462

(22) Filed: Aug. 19, 2016

(65) Prior Publication Data

US 2017/0055261 A1 Feb. 23, 2017

Related U.S. Application Data

(60) Provisional application No. 62/267,419, filed on Dec. 15, 2015, provisional application No. 62/207,501, filed on Aug. 20, 2015.

(51) Int. Cl.
*H04W 76/14* (2018.01)
*H04W 8/00* (2009.01)
*H04W 84/12* (2009.01)
*H04W 88/04* (2009.01)

(52) U.S. Cl.
CPC ........... *H04W 76/14* (2018.02); *H04W 8/005* (2013.01); *H04W 84/12* (2013.01); *H04W 88/04* (2013.01)

(58) Field of Classification Search
CPC . H04W 52/02; H04W 52/0229; H04W 84/12; H04W 8/00; H04W 8/005; Y02B 60/50
USPC ........................................................ 370/311
See application file for complete search history.

(56) References Cited

U.S. PATENT DOCUMENTS

| 9,439,147 B2 | 9/2016 | Huang et al. | |
|---|---|---|---|
| 2015/0036540 A1* | 2/2015 | Kasslin | H04W 48/18 370/254 |
| 2015/0081840 A1* | 3/2015 | Patil | H04L 67/28 709/217 |
| 2015/0098388 A1* | 4/2015 | Fang | H04W 48/16 370/328 |
| 2015/0172391 A1* | 6/2015 | Kasslin | H04L 67/16 370/338 |

(Continued)

FOREIGN PATENT DOCUMENTS

WO WP16126137 8/2016

*Primary Examiner* — Asad M Nawaz
*Assistant Examiner* — Berhanu D Belete
(74) *Attorney, Agent, or Firm* — Meyertons Hood Kivlin Kowert and Goetzel PC; Jeffrey C. Hood; Brian E. Moore

(57) ABSTRACT

In embodiments, one or more wireless stations operate to configure direct communication with neighboring mobile stations, i.e., communication between the mobile stations without utilizing an intermediate access point. Configuration of NAN includes mapping of NAN clusters and multi-hop data routing within a NAN cluster. A wireless device may transmit a subscribe service discovery frame (SDF) to one or more neighboring wireless devices and receive a respective publish SDF from the one or more wireless devices, the respective publish SDF including respective wireless device information. The wireless device may maintain a data structure comprising the respective wireless device information. In some embodiments, the wireless device information may include an address, hop count, and/or service indications, e.g., for data routing and/or service discovery.

20 Claims, 10 Drawing Sheets

(56) References Cited

U.S. PATENT DOCUMENTS

| | | | | |
|---|---|---|---|---|
| 2015/0319675 A1* | 11/2015 | Park | H04W 48/16 | 370/338 |
| 2015/0350936 A1* | 12/2015 | Qi | H04W 24/02 | 370/252 |
| 2015/0365835 A1* | 12/2015 | Segev | H04W 8/005 | 370/252 |
| 2015/0382301 A1* | 12/2015 | Huang | H04W 52/0229 | 370/311 |
| 2016/0014694 A1 | 1/2016 | Patil et al. | | |
| 2016/0050551 A1* | 2/2016 | Qi | H04W 48/10 | 455/434 |
| 2016/0073330 A1* | 3/2016 | Patil | H04L 61/2015 | 709/220 |
| 2016/0157089 A1* | 6/2016 | Qi | H04W 76/27 | 370/254 |
| 2016/0157193 A1* | 6/2016 | Qi | H04W 56/00 | 370/350 |
| 2016/0174139 A1* | 6/2016 | Segev | H04W 8/005 | 455/434 |
| 2016/0226928 A1* | 8/2016 | Park | H04L 65/1073 | |
| 2016/0234301 A1 | 8/2016 | Qi et al. | | |
| 2016/0249409 A1* | 8/2016 | Kim | H04W 76/36 | |
| 2016/0277370 A1* | 9/2016 | Lee | H04W 8/005 | |
| 2016/0277914 A1* | 9/2016 | Kim | H04W 8/005 | |
| 2016/0286388 A1* | 9/2016 | Marin | H04L 63/0421 | |
| 2016/0323925 A1* | 11/2016 | Alanen | H04W 8/005 | |
| 2016/0337836 A1* | 11/2016 | Kim | H04W 4/08 | |
| 2016/0345295 A1* | 11/2016 | Yang | H04W 8/005 | |
| 2016/0353269 A1* | 12/2016 | Kasslin | H04W 8/005 | |
| 2017/0026282 A1* | 1/2017 | Huang | H04L 45/122 | |
| 2017/0041779 A1* | 2/2017 | Sandhu | H04W 8/005 | |
| 2017/0156031 A1* | 6/2017 | Segev | H04W 4/025 | |
| 2018/0227707 A1* | 8/2018 | Segev | H04W 4/025 | |

* cited by examiner

| Field | Size (Octets) | Value | Descripition |
|---|---|---|---|
| Sub-Attribute ID | 1 | Variable | Identifies tyep of sub-attribute for cluster mapping |
| Length | 1 | Variable | Length of value field |
| Value | Variable | Variable | value specific to field type |

*FIG. 6A*

| Sub-attribute ID Value | Description |
|---|---|
| 0 | originator device information |
| 1 | publisher device information |
| 2 | remote device informaiton |
| 3 | device name |
| 4 | ranging information |
| 5-253 | reserved |
| 254 | vendor specific information |
| 255 | reserved |

*FIG. 6B*

| Control | Master Pref | Random Num | Hop count to AM | Cluster ID | Immediate Sync Master |
|---------|-------------|------------|-----------------|------------|------------------------|
| 1 octet | 1 octet | 1 octet | 1 octet | 2 octets | 6 octets |

*FIG. 7A*

| Device Role | Reserved |
|-------------|----------|
| B0-B3 | B4-B7 |

*FIG. 7B*

| Role | Values |
|------|--------|
| Achor Master | 0 |
| Master | 1 |
| Non-master sync | 2 |
| Non-master non-sync | 3 |

*FIG. 7C*

| Originator Address | Hop Count | Hop Count Limit |
|---|---|---|
| 6 octets | 1 octet | 1 octet |

*FIG. 8*

| Originator Address | Hop Count from Remote Device | List of remote device information |
|---|---|---|
| 6 octets | 1 octet | variable |

*FIG. 9*

| OUI | Data |
|---|---|
| 3 Octets | variable |

*FIG. 10*

NEIGHBOR AWARENESS NETWORKING TREE MAPPING

PRIORITY DATA

This application claims the benefit of priority to U.S. Provisional Application Ser. No. 62/207,501, titled "Neighbor Awareness Networking Mapping and Multi-hop", filed Aug. 20, 2015, by Lawrie Kurian and Yong Liu and U.S. Provisional Application Ser. No. 62/267,419, titled "Neighbor Awareness Networking Mapping and Multi-hop", filed Dec. 15, 2015, by Lawrie Kurian and Yong Liu, each of which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to methods for mapping NAN clusters and to multi-hop NAN implementations.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate to configure direct communication with neighboring mobile stations, i.e., direct communication between the mobile stations without utilizing an intermediate access point. Configuration of NAN includes mapping of NAN clusters and multi-hop data routing within a NAN cluster. A NAN device may transmit a subscribe service discovery frame (SDF) to one or more neighboring NAN devices and receive a respective publish SDF from the one or more NAN devices, the respective publish SDF including respective NAN device information. The NAN device may maintain a data structure comprising the respective NAN device information. In some embodiments, the NAN device information may include address, hop count, and/or service indications, e.g., for data routing and/or service discovery.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 6A illustrates an example of a sub-attribute field, according to some embodiments.

FIG. 6B illustrates an example of values of a sub-attribute field, according to some embodiments.

FIG. 7A illustrates an example of a device information attribute, according to some embodiments.

FIG. 7B illustrates an example of a control field attribute, according to some embodiments.

FIG. 7C illustrates an example of control field attribute values, according to some embodiments.

FIG. 8 illustrates an example of an information sub-attribute, according to some embodiments.

FIG. 9 illustrates an example of a remote device sub-attribute, according to some embodiments.

FIG. 10 illustrates an example of a vendor specific sub-attribute, according to some embodiments.

Figure 1:
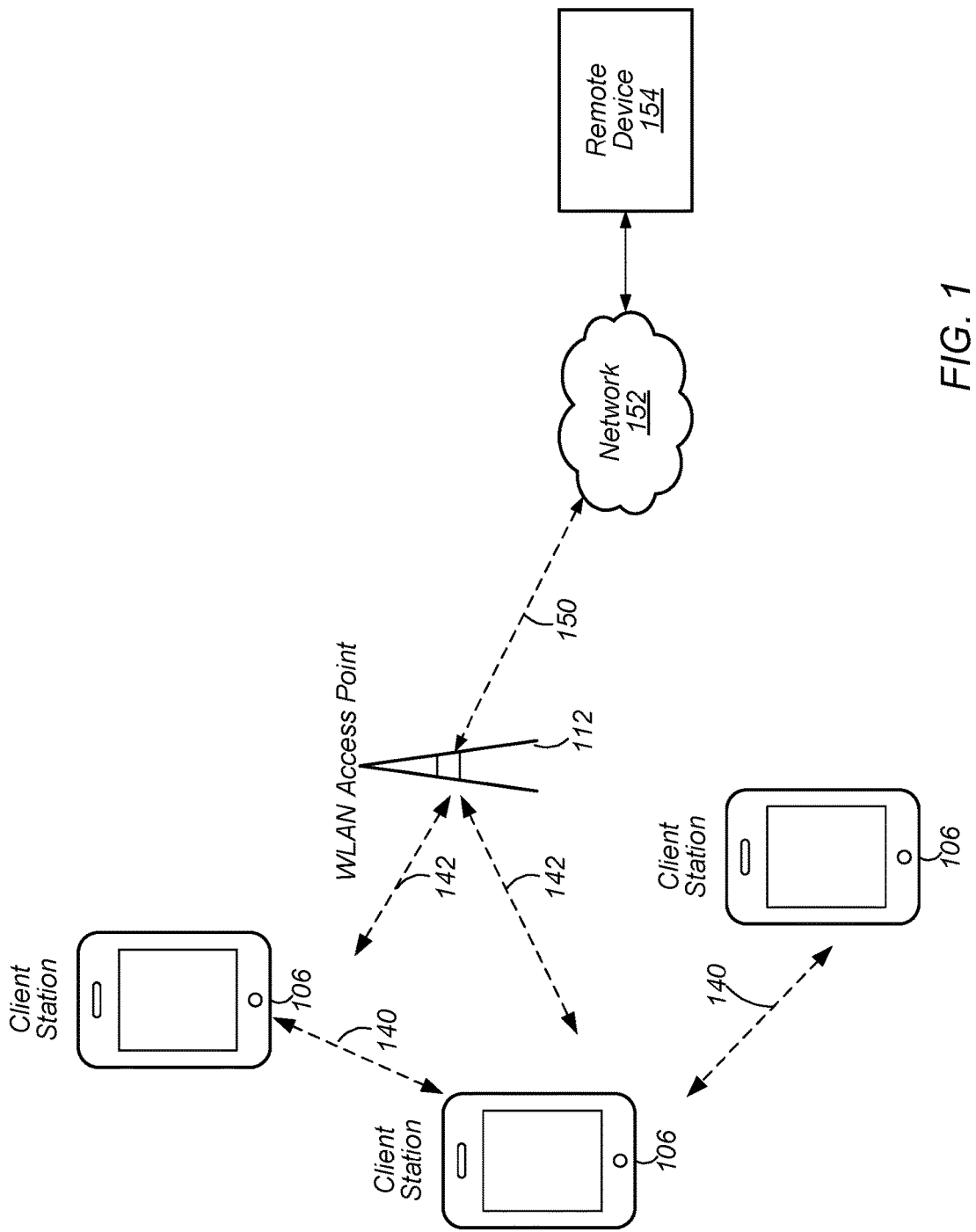
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

TERMINOLOGY

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods for transmitting a subscribe service discovery frame (SDF) to one or more neighboring peer devices and receiving a respective publish SDF from the one or more peer devices, the respective publish SDF including respective peer device information. The wireless device may maintain a data structure including the respective peer device information. In some embodiments, the peer device information may include address, hop count, and/or service indications, e.g., for data routing and/or service discovery. In some embodiments, the subscribe SDF may indicate a service sought by the wireless device. In some embodiments, the peer device information may include address, hop count, and/or service indications for a remote device not detectable by the wireless device.

Figure 2:
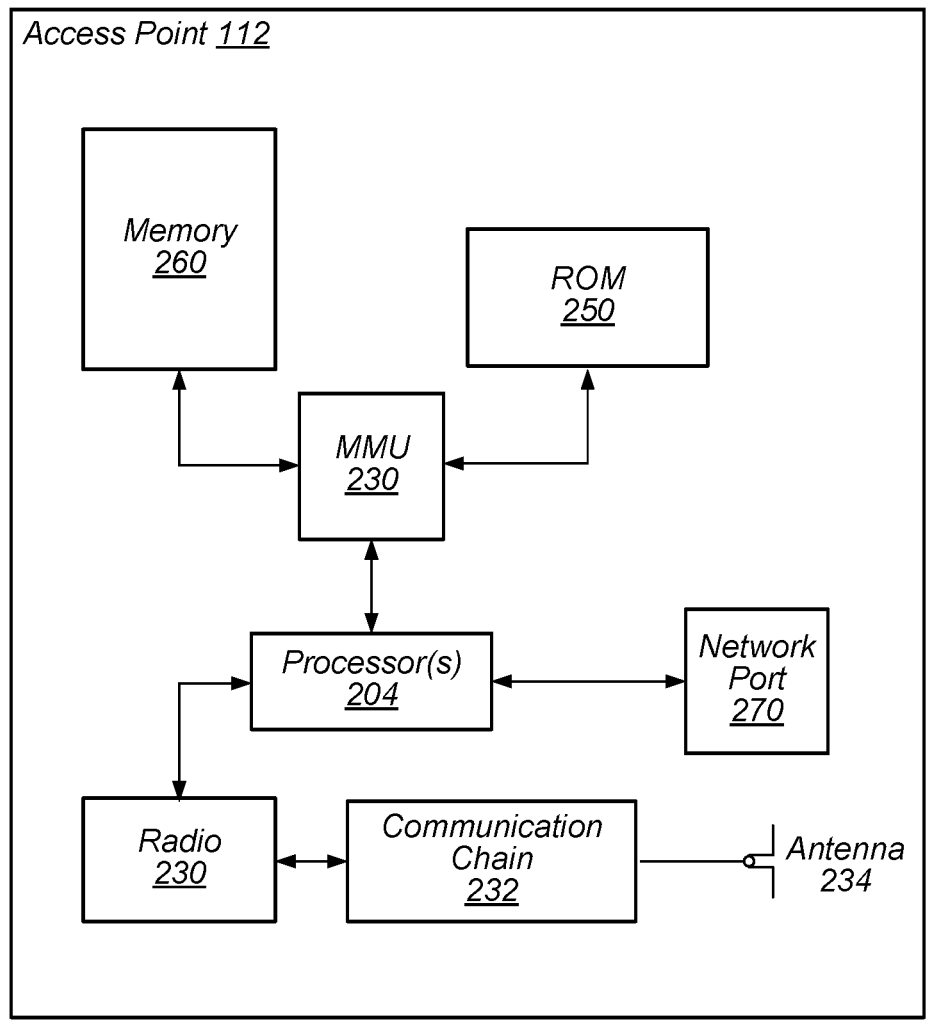
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for transmitting a subscribe service discovery frame (SDF) to one or more neighboring devices and receiving a respective publish SDF from the one or more devices, the respective publish SDF including respective device information. The access point may maintain a data structure including the respective device information. In some embodiments, the device information may include address, hop count, and/or service indications, e.g., for data routing and/or service discovery. In some embodiments, the subscribe SDF may indicate a service sought by the wireless device. In some embodiments, the device information may include address, hop count, and/or service indications for a remote device not detectable by the access point.

Figure 3:
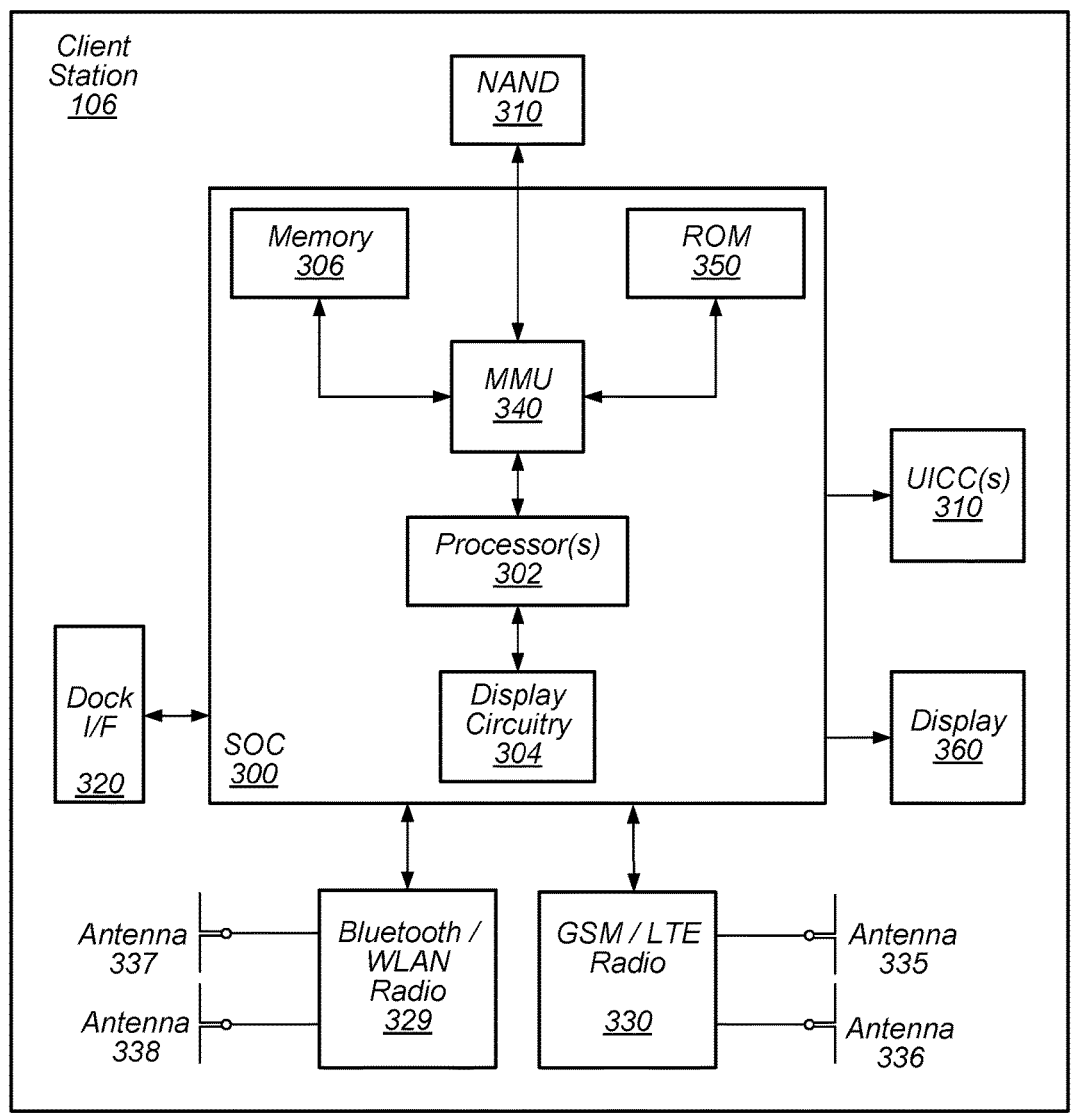
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (IF) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for transmitting a subscribe service discovery frame (SDF) to one or more neighboring peer devices and receiving a respective publish SDF from the one or more peer devices, the respective publish SDF including respective peer device information. The client station may maintain a data structure including the respective peer device information. In some embodiments, the peer device information may include address, hop count, and/or service indications, e.g., for data routing and/or service discovery. In some embodiments, the subscribe SDF may indicate a service sought by the wireless device. In some embodiments, the peer device information may include address, hop count, and/or service indications for a remote device not detectable by the wireless device.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information, such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements, and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for mapping NAN clusters and multi-hop NAN implementations.

Wi-Fi NAN Tree Mapping

As per NAN 1.0, non-master-non-sync (NMNS) NAN devices shall not send any NAN beacons, thereby rendering the NMNS NAN devices invisible to peers without service discovery frames (SDFs). In addition, NAN beacons may only carry an anchor master (AM) address and not an immediate (or intermediate) master address. Hence, a NAN device (e.g., an over the air (OTA) sniffer) attempting to map a NAN cluster (e.g., a NAN tree hierarchy) may not be able to fully map the NAN cluster based on NAN beacons. Further, the NAN device may be limited by the NAN device's service range, since the NAN device may only discover other NAN devices (e.g., nodes and/or services) that are within the NAN device's range and, further, that have a matching service ID as compared to the NAN device's service ID.

Figure 4:
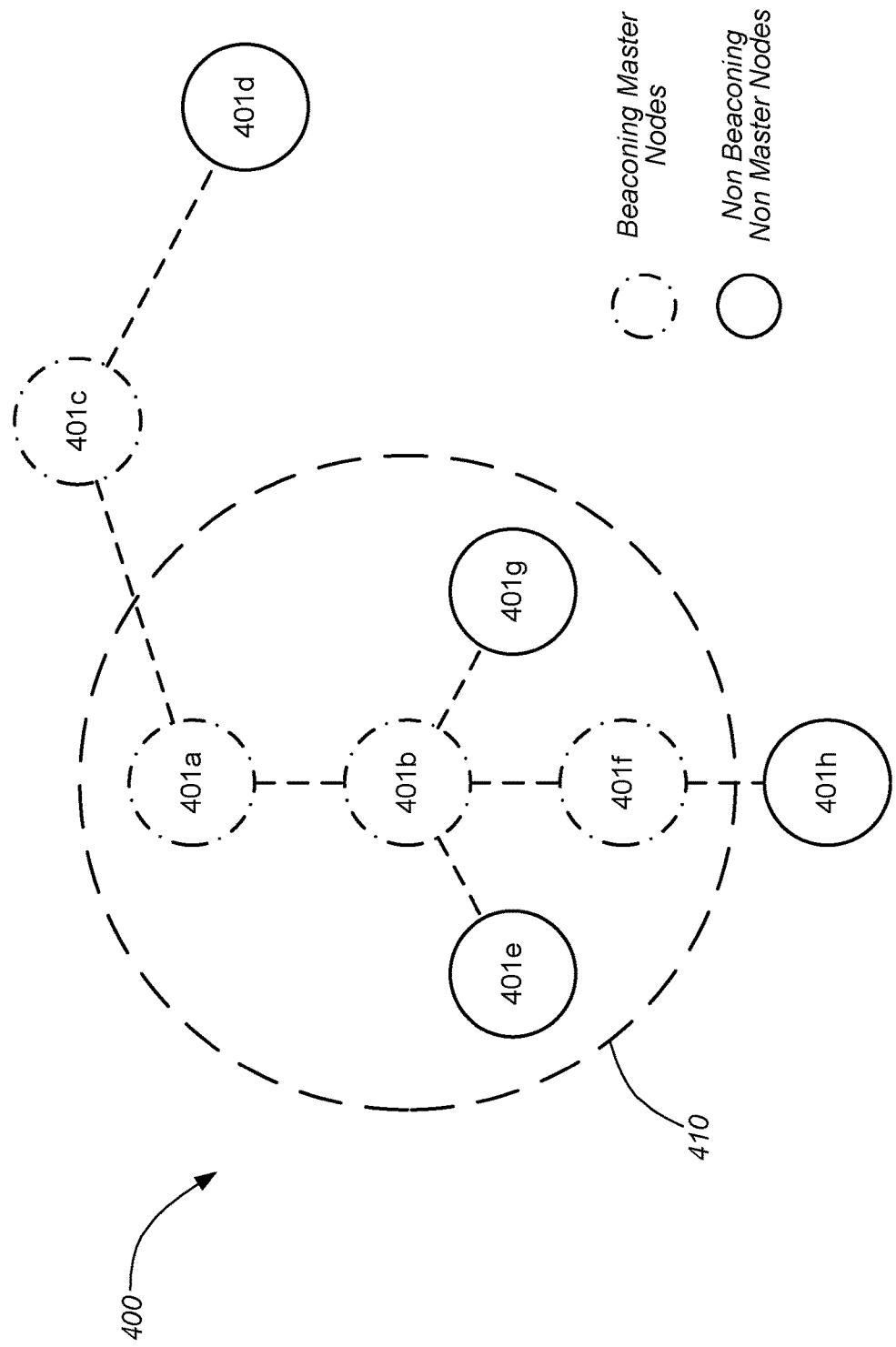
FIG. 4 illustrates an example of a device attempting to map a data cluster.

For example, FIG. 4 illustrates an example of a device attempting to map a data cluster, e.g., in prior implementations. As illustrated, a first device 401b (e.g., a first NAN device) may attempt to map data cluster 400 (e.g., a NAN data cluster) that includes devices 401a, 401c, 401d, 401e, 401f, 401g, and 401h. First, note that device 401b may have a service range 410 that only includes devices 401a, 401e, 401f, and 401g. Second, note that devices 401a, 401c, and 401f may be beaconing master nodes. Thus, since devices 401a and 401f are sending beacons and are within service range 410, device 401b may be able to discover devices 401a and 401f. However, device 401c may not be discoverable by device 401b, since device 401c is outside service range 410 of device 401b. In addition, beacons (e.g., NAN beacons) may not include information for device 401b to determine whether any of the beaconing master nodes (e.g., devices 401a, 401c, and 401f) are in a master or non-master-sync state. Thus, apart from an anchor master of the cluster, intermediate master information may not be identified in the cluster. In other words, beacons may not include an immediate master address. Third, note that devices 401d, 401e, 401g, and 401h may be non-master-non-sync (NMNS) nodes and, therefore, invisible to device 401b. In other words, since devices 401d, 401e, 401g, and 401h are passive nodes, device 401b may be unable to discover any of these nodes even though devices 401e and 401g are within service range 410.

In addition to the above described scenario, limited discovery capabilities may result in more challenging debugging. Further, collecting and consolidating all NAN state information from neighboring devices may become unmanageable.

Therefore, in some embodiments, systems and methods may ease debugging while allowing discovery of all nodes (e.g., NAN nodes or peer nodes) in a cluster (e.g., a NAN cluster or peer cluster), including visualization of a position of a node in a cluster (e.g., a cluster tree) and mapping of the cluster. In some embodiments, to map a cluster (e.g., a NAN cluster), information may be gathered from all devices within the cluster during a discovery window when all devices within the cluster are active. In some embodiments, a solicited publish service for mapping may be implemented to enable discovery of both active (e.g., devices broadcasting beacons) and passive (e.g., devices not broadcasting beacons) devices within the cluster. The publish service may include a device state (master, non-master, sync, non-sync, etc.).

In some embodiments, a service discovery frame (SDF) may include a frame address. The frame address may include a default service identifier (ID) particular to a mapping supported by all devices. Additionally, the default service ID may be collected in response to receipt of a subscribe SDF. In other words, a subscribe SDF may trigger information collection to identify the subscribing device and include the default service ID. In addition, in some embodiments, a device state (e.g., master on non-master-sync) may be included in a service information field of an SDF. In some embodiments, a publish SDF may include a publishing device's current state in the service information field. Additionally, according to some embodiments, a device (e.g., a node) may be enabled to forward a subscribe SDF in order to propagate information collection within a cluster.

In some embodiments, a device (e.g., such as client station 106 described above) may be categorized using a plurality of node types (e.g., beaconing device, originating device, forwarding device, triggering device, remote device, and so forth). For example, a beaconing device (or node) may refer to any (NAN) device (or node) that transmits synchronization beacons. In other words, a beaconing node may refer to any device that is an anchor master, a master, or a non-master sync. In addition, an originating node (or device) may refer to a device that initiates a mapping service by transmitting a mapping service subscribe SDF. In other words, the originating node may be the node that initiates a mapping on a NAN cluster. Said another way, the originating node may be the node that collects information regarding the cluster by initiating a subscribed service for mapping the cluster. Further, a forwarding node (or device) may refer to any beaconing node that represents (or instantiates) a mapping service to forward the mapping service subscribe SDF to other nodes. In other words, the forwarding node is a beaconing node that propagates the mapping service subscribe SDF to nodes that are also receiving the forwarding node's beacon. Said another way, the forwarding node is a beaconing node that initiates, e.g., autonomously, a subscribe service for mapping on reception of a mapping subscribe from another beaconing device. Additionally, a triggering device (or node) may refer to a node that triggers a forwarding node to start forwarding the mapping service subscriber SDF. Thus, in some embodiments, an originating node may become a triggering node. Further, a remote device (or node) may be a device beyond the transmission/reception reach of an originating device. In other words, a remote device may be a device outside of a service range of another device, such as an originating device.

In some embodiments, nodes may be solicited publishers of a mapping service. Thus, a publishing node may include its own device information in its publish SDF service information. The device information, in some embodiments, may include any of a self-role field indicating a role of the publishing node, a cluster identifier (clusterID), an address of an immediate sync master, an anchor master address, and/or a hop count to the anchor master. In such embodiments, an originating node may transmit a subscribe SDF for the mapping service in order to map a cluster (e.g., a NAN cluster). In addition to the device information, the originating subscriber may include any/all of a medium access control (MAC) address, a hop count field set to zero (e.g., to indicate that it is an originating node), and/or a hop count limit in the subscribe SDF service information. Upon reception of the subscribe SDF, neighboring nodes may reply back to the originating node with a unicast publish of respective device information. Based on the replies, the originating node may generate (or update and/or maintain) a data structure (e.g., a list or table) that may include identification of nodes that replied to the originating node, as well as respective device information for each replying node.

Figure 5A:
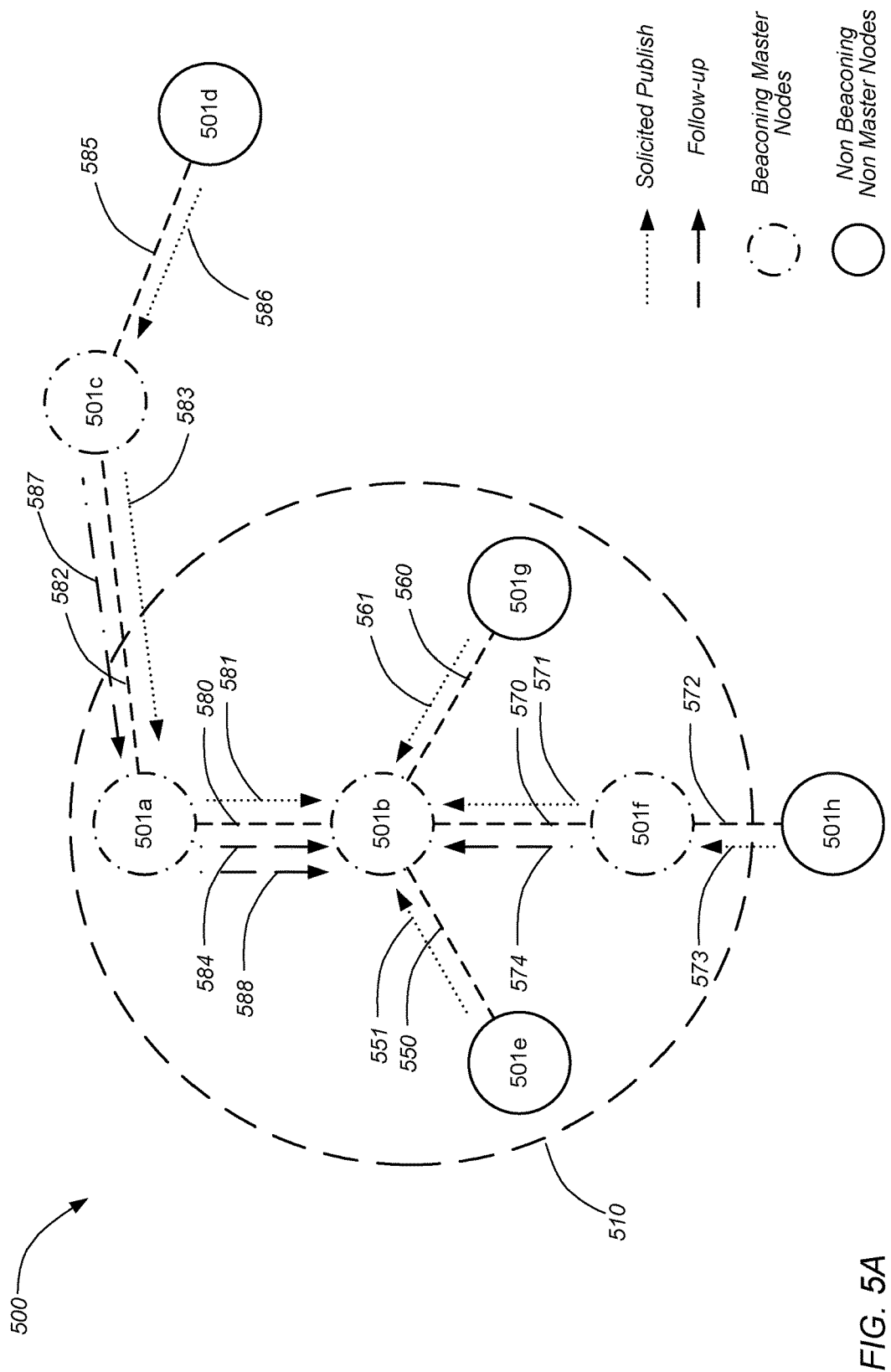
FIGS. 5A and 5B illustrate examples of signaling for a device mapping a data cluster, according to some embodiments.
Figure 5B:
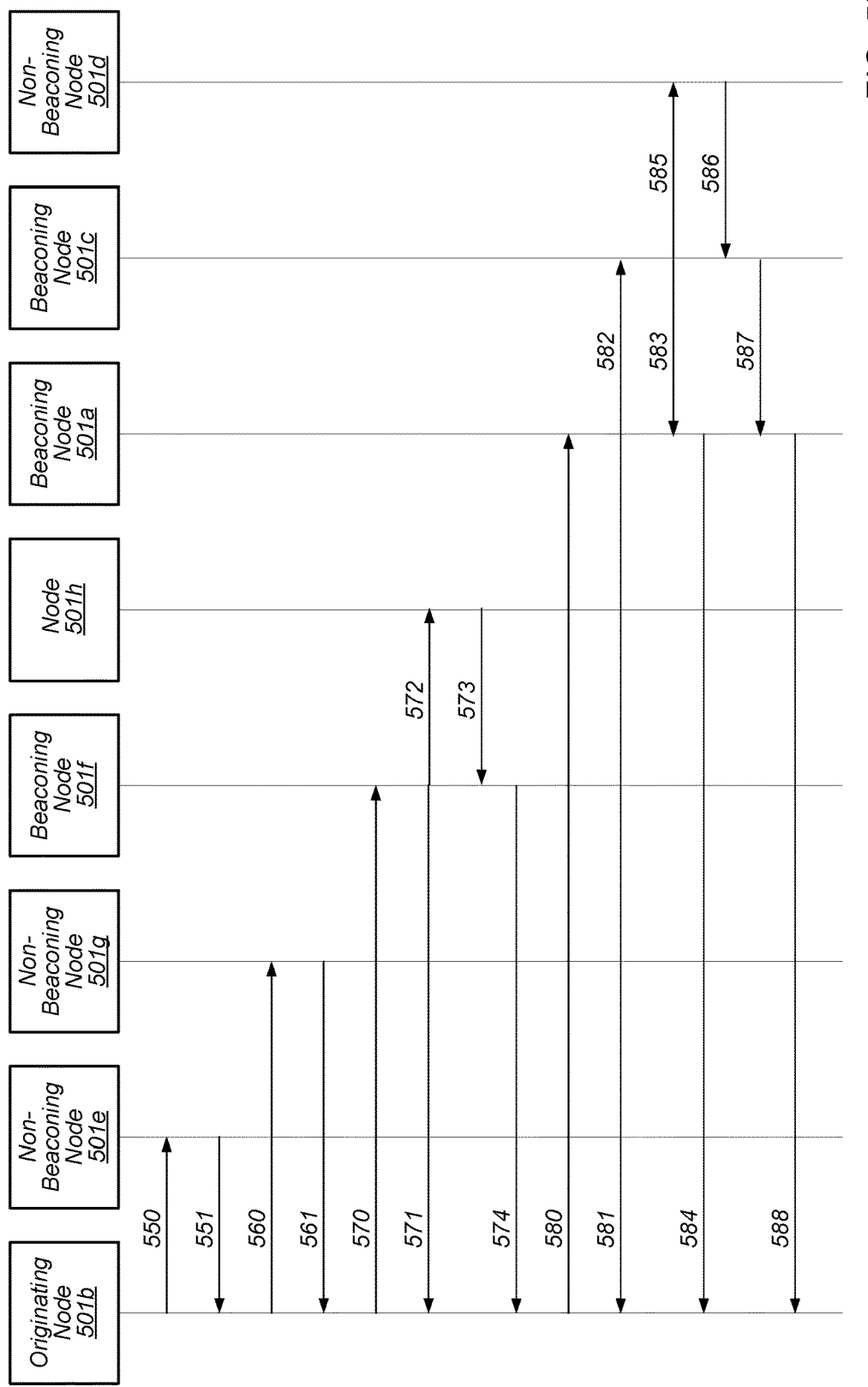

For example, FIGS. 5A and 5B illustrate examples of signaling for a device mapping a data cluster, according to some embodiments. Note that the signaling shown in FIGS. 5A and 5B may be used in conjunction with any of the above described embodiments as well as the systems/devices shown in the above Figures, among other devices. In various embodiments, some of the signaling shown may be performed concurrently, in a different order than shown, or may be omitted. Additional signaling may also be performed as desired.

FIG. 5A illustrates a group or cluster of devices. FIG. 5B illustrates a signaling diagram between devices in the group/cluster illustrated in FIG. 5A. As illustrated, a device, such as node 501b may attempt to map data cluster 500 (which, in some embodiments, may be a NAN data cluster). Thus, node 501b, which may be a device such as client station 106 described above, may be an originating node and may transmit one or more subscribe SDFs (e.g., signals 550, 560, 570, and 580) to nodes within node 501b's service range 510 (e.g., nodes 501a, 501e, 501f, and 501g). The subscribe SDF may be a broadcast SDF. In addition, the subscribe SDF may include a mapping service identifier. The respective nodes (e.g., nodes 501a, 501e, 501f, and 501g) may reply (e.g., via signals 551, 561, 571, and 581) to node 501b and node 501b may update device information for each respective replying node. The reply may be a solicited publish SDF and may include device information, as described above. Thus, node 501b may generate and/or maintain a list of device information for nodes 501a, 501e, 501f, and 501g.

In some embodiments, in addition to replying to an originating node, such as node 501b, a beaconing node (e.g., nodes 501a and 501f) may forward, on behalf of node 501b, the subscribe SDF (e.g., respective content of signals 570 and 580) received from the originating node, a new instance of the received subscribe SDF, or a representation of the subscribe SDF. Thus, each beaconing node (e.g., nodes 501a and 501f), after publishing back (e.g., via signals 571 and 581) to the subscriber (originating node 501b) may instantiate a new subscribe SDF instance (e.g., signals 572 and 582) to forward the mapping request to nodes more than 1 hop count from the originating node, thus becoming forwarding nodes. Note that in some embodiments the originating node may also be referred to as a triggering node. In addition, the forwarding node (e.g., nodes 501a and 501f) may duplicate the service information from the triggering node (node 501b) and may additionally increment a hop count by 1 before transmitting the new subscribe SDF. In some embodiments, the forwarding node may include the MAC address of the triggering node and the originating node (if different from the triggering node) in a match filter SRF to filter out the triggering and originating node to avoid looping the new subscribe SDF. In other words, the forwarding node may include the MAC address of the triggering and originating node to avoid the new subscribe SDF being sent to these nodes.

For example, node 501f may broadcast a new instance of the subscribe SDF (e.g., signal 572) to node 501h. Similarly, node 501a may broadcast a new instance of the subscribe SDF (e.g., signal 582) to node 501c. In response, nodes 501h and 501c may send a solicited publish SDF (e.g., signals 573 and 583, respectively) to nodes 501f and 501a. The solicited publish SDF may include device information for the transmitting device and may also include a hop count. In some embodiments, the hop count may be set to 1 or incremented by 1. In addition, nodes 501f and 501a may send a follow up SDF (e.g., signals 574 and 584, respectively) to node 501b including information received in the solicited publish SDF (e.g., signals 573 and 583, respectively). Thus, in some embodiments, the forwarding node (e.g., nodes 501a and 501h) may consolidate all of the publisher's device information (e.g., nodes 501c and 501f) and send it back to the triggering node in a follow-up SDF (e.g., signals 583 and 573, respectively). The follow-up SDF may include the originating node's MAC address, a list of publisher's device information and/or a hop count to its publishers. Note that if a forwarding node receives a follow-up from another forwarding node, the receiving forwarding node may simply increment the hop count by 1 before forwarding the SDF to its triggering node.

In addition, node 501c, since it is also a beaconing master node, may broadcast a new instance of the subscribe SDF (e.g., signal 585) to node 501d. In response, node 501d may send a solicited publish SDF (e.g., signal 586) to node 501c that may include device information for node 501d. Node 501c may send a follow up SDF (e.g., signal 587) to node 501a including the device information for node 501d, including a hop count set to 1 according to some embodiments. Note that with regard to node 501c, node 501b is an originating node and node 501a is a triggering node. In response to the follow up SDF from node 501c, node 501a may send an additional follow up SDF (e.g., signal 588) to node 501b including the device information for node 501d, including incrementing a hop count by 1 according to some embodiments.

In some embodiments, a publish SDF may include one or more attributes (or fields), such as service name (e.g., a UTF-8 name string such as "nan-cluster-map._upd), service specific information (service specific info), and/or configuration parameters. The service specific information may be or may include an information sub-attribute as further described below in reference to FIGS. 7A-7C, as well as other sub-attributes as further described below in reference to FIGS. 6A-6B. The configuration parameters may include one or more attributes (or fields), such as publish type (solicited or unsolicited), solicited transmission type (unicast or multicast), time to live (note that in some embodiments, an instance of a publish service may run until cancelled), discovery range (e.g., any NAN device within range), and/or event condition.

In some embodiments, a subscribe SDF may include attributes (or fields) such as service name (e.g., a UTF-8 name string such as "nan-cluster-map._udp), service specific information (service specific info), configuration parameters, and/or service response filter. The service specific information may be or may include an information sub-attribute as described below in reference to FIG. 8, as well as other sub-attributes as further described below in reference FIGS. 6A and 6B. The configuration parameters may include attributes (or fields) such as subscribe type (active or passive), time to live (note that in some embodiments, an instance of a subscribe service may run until cancelled), discovery range (e.g., any NAN device within range), and/or query period (e.g., every 1, 5, 10, 15, 20, and so forth discovery window). The service response filter may include a type field, a control field, and or a MAC address of a NAN trigger device.

In some embodiments, a follow-up transmit SDF may include attributes (or fields) such as service specific information (service specific info), handle, and/or configuration parameter. The service specific information may be or include an information sub-attribute as further described below in reference to FIG. 9. The handle may include a publish instance identification or identifier (ID) of a NAN mapping publish service instance. The configuration parameter may include a NAN interface address (e.g., a MAC address of a triggering NAN device) and/or a requestor instance ID (e.g., a subscribed instance ID of a triggering NAN device).

In some embodiments, a NAN cluster mapping service information sub-attribute as included in a service information field may include a NAN sub-attribute ID field, a length field, and a sub-attribute specific data (or value) field. In some embodiments, as illustrated in FIG. 6A, a sub-attribute ID field may be 1 octet and identify a type of NAN sub-attribute, a length field may be 1 octet and describe a length of a data (or value) field, and a value (or data) field of variable size (or length) may include one or more values specific to the type of NAN sub-attribute. FIG. 6B further illustrates sub-attribute ID values for various types of SDFs as described above, according to some embodiments. Thus, a sub-attribute ID value of 0 may indicate originator device information, a value of 1 may indicate publisher device information, a value of 2 may indicate remote device information, a value of 3 may indicate a device name, a value of 4 may be used for ranging information, values of 5-253 may be reserved, a value of 254 may indicate vendor specific information, as described below in reference to FIG. 10, and a value of 255 may be reserved. However, in other implementations, values can be assigned differently and/or to more, fewer, and/or different types of information.

In some embodiments, as illustrated at FIG. 7A, a publisher device information sub-attribute may include fields (or parameters/attributes) such as any/all of control, master preference (pref), random number (num), hop count to anchor master (AM), cluster identity (ID), immediate sync master, anchor master address, AM master preference, AM random number, and/or TSF low. In some embodiments, the control field, as illustrated at FIG. 7B, may include a NAN device role, as illustrated at FIG. 7C. Thus, as shown in FIG. 7B, a control field may include 4 bits (B0-B3) for indication of device role and 4 bits (B4-B7) that are reserved. Further, as illustrated a FIG. 7C, a control field value of 0 may indicate a role of anchor master, a control field value of 1 may indicate a role of master, a control field value of 2 may indicate a role of non-master sync, and a control field value of 3 may indicate a role of non-master non-sync. In other implementations, field sizes and/or field values can be assigned differently, including specifying more, fewer, or different field values.

Additionally, in some embodiments, the master preference may be a device's NAN master preference, the random number may be a device's NAN random number, the hop count may be a device's hop count to its anchor master, the cluster ID may be a last 2 octets of a current NAN cluster ID, immediate sync master may be a MAC address of a master to which a device is getting NAN synchronization, anchor master address may be a MAC address of an anchor master of a cluster to which a device belongs, AM master preference may be an anchor master's preference, AM random number may be an anchor master's random number, and TSF low may be a current NAN TSF of a NAN device.

In some embodiments, as illustrated at FIG. 8, an originator device information sub-attribute may include fields (or parameters/attributes) such as an originator address, a hop count, and a hop count limit. The originator address may include a MAC address of a NAN device that originated a mapping service. In some embodiments, the hop count may be set to zero by an originating NAN device and incremented by 1 by each forwarding device, prior to forwarding a subscribe SDF. The hop count limit may be used to limit a mapping of a NAN cluster to a set hop count. In some embodiments, a value of 255 may indicate (or imply) no limit on hop count.

In some embodiments, as illustrated at FIG. 9, a remote device information sub-attribute may include fields (or parameters/attributes) such as originator address, hop count from remote device, and/or a list of remote device information. The originator address may include a MAC address of a NAN device that originated a mapping service. In some embodiments, hop count from remote device (HCFR) may be a hop count of a device transmitting this follow-up SDF from remote publishing devices in the list of remote device info, and the list of remote device information (info) may be a list of remote publisher device information, as described above in reference to FIG. 7A.

In some embodiments, as illustrated at FIG. 10, a vendor specific sub-attribute may include 3 octets for an organizationally unique identifier (OUT) and data can be represented using a variable length.

Wi-Fi NAN Multi-Hop

In Internet of Things (IoT) implementations, range of certain devices can be an issue, as most of the devices are connected in some way to an infrastructure network. For example, multiple Wi-Fi IoT devices (switches, light bulbs, speakers, smoke detectors, temperature sensors, smart vents, thermostats, refrigerators, dish washers, clothes washers, clothes dryers, locks, and so forth) in a common room may not have the same reachability or level of connectivity to an access point. In such instances, some IoT devices may become inoperable without infra-connectivity (e.g., NAN connectivity) unless repeaters and/or additional access points are installed. Further, there may be limitations on the number of devices (stations) that can associate with an access point. In addition, some NAN implementations (e.g., NAN 1.0 or 2.0 as proposed) may be limited in terms of how many hops can be utilized to transfer data, e.g., limited to single hop data transfer.

Embodiments described below disclose systems and methods to eliminate the use of repeaters for IoT devices and further allow devices (e.g., NAN devices) to reach one or more devices beyond a single hop, e.g., to communicate beyond a single hop, discover services beyond a single hop, transfer data to a peer node in a cluster (e.g., NAN cluster) beyond one hop, and/or determine routing to other nodes in the cluster.

In some embodiments, a mapping service as described above may be extended for data routing to other nodes in a cluster (e.g., a NAN cluster). For example, a node of a cluster may send a subscribe SDF as an originating node and each node in the cluster receiving the subscribe SDF may learn the originating node's MAC address as well as a hop count (via included service information) to the originating node. Additionally, the originating node may learn routes to each node within 1 hop count via their publish SDF response. In addition, the originating node may learn routes to remote nodes (greater than 1 hop count) from follow up SDFs (forwarded by beaconing nodes, e.g., as described above in reference to FIGS. 5A-5B) that include the hop count to the respective remote node. Note that if a beaconing node already has a route entry to the originating node with a lower hop count, the beaconing node may not become a forwarding node for the originating node. Additionally, the originating node may include a specific service instance in the service information it is seeking to determine if any of the remote nodes support that specific service instance.

In some embodiments, each node may maintain a route table (e.g., a data structure including routing information). The route table may include, e.g., a MAC address of a destination node, a hop count to the destination node, and a MAC address for a forwarding node. The route table may be updated (e.g., a route entry may be added and/or updated) by a node upon reception of an SDF, such as a subscribe SDF, a publish SDF, and/or a follow up SDF. In some embodiments, upon reception of a subscribe SDF, a publisher node may use an address2 field in a MAC header and a service information field in the subscribed SDF to identify a route back to the originator/subscriber. In some embodiments, upon reception of a publish SDF, the subscribing node may use the publisher node's MAC address to create an entry back to the publisher node. In some embodiments, upon reception of a follow up SDF, the receiving node may create an entry for each destination node in the follow up SDF payload with a specified hop count and address2 of the follow up SDF as a next hop destination.

Figure 11:
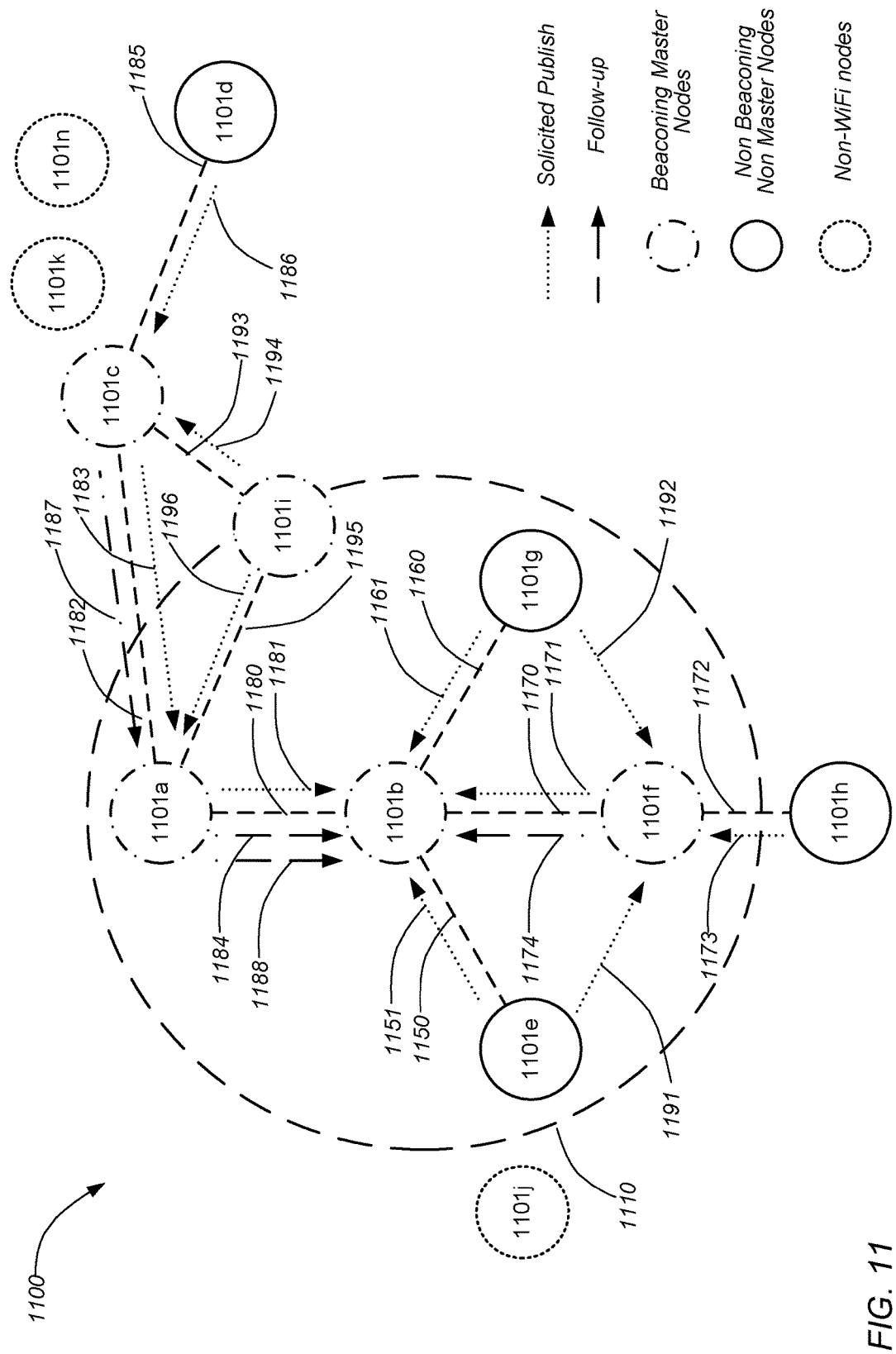
FIG. 11 illustrates an example of propagation of a route table according to some embodiments.

For example, FIG. 11 illustrates an example of propagation of a route table according to some embodiments. As shown, node 1101b may be an originating node and may broadcast a subscribe SDFs (e.g., signals 1150, 1160, 1170, and 1180) to nodes 1101a, 1101e, 1101g, and 1101f, including a hop count set to zero according to some embodiments. Nodes 1101a, 1101e, 1101f, and 1101g, each of which is within service range 1110 of node 1101b, may respond to node 1101b with a solicited publish SDF (e.g., signals 1151, 1161, 1171, and 1181) that may include device information as described above. Node 1101b may use the solicited publish SDFs (e.g., signals 1151, 1161, 1171, and 1181) to update (propagate) device information for any/all of nodes of 1101a, 1101e, 1101f, and 1101g. Similarly, any/all of nodes 1101a, 1101e, 1101f, and 1101g may update device information for node 1101b, using the subscribe SDF received from node 1101b (e.g., signals 1150, 1160, 1170, and 1180).

In addition, since nodes 1101a and 1101f are beaconing master nodes (e.g., they are connected to another node), nodes 1101a and 1101f may forward a new instance of the subscribe SDF (e.g., signals 1172 and 1182) on behalf of 1101b. According to some embodiments, nodes 1101a and 1101f may increment, by 1, the hop count carried in or otherwise reflected by node 1101b's subscribe SDF. Thus, node 1101f may broadcast a new instance of the subscribe SDF (e.g., signal 1172), including node 1101b's MAC address and a hop count equal to 1 in a service information field of the SDF, according to some embodiments. In response, node 1101h may send a solicited publish SDF (e.g., signal 1173) to node 1101f that may include device information for node 1101h. In addition, according to some embodiments, node 1101h may use the service information in the subscribe SDF from node 1101f to update route information to either/both of nodes 1101f and 1101b. Node 1101f may use the solicited publish SDF (e.g., signal 1173) from node 1101h to update device information for node 1101h. Similarly, node 1101f may update device information for node 1101h as well as nodes 1101e (e.g., via device information included in signal 1191) and 1101g (e.g., via device information included in signal 1192). Node 1101f may send a follow up SDF (e.g., signal 1174) to node 1101b including the device information for node 1101h and may set a hop count associated with node 1101h to 1. Node 1101b may use the follow up SDF (e.g., signal 1174) to update device information for node 1101h (e.g., node 1101b may update the hop count to node 1101h by incrementing the hop count by 1). Note that with regard to node 1101f, node 1101b is both an originating and triggering node.

In addition, node 1101a may broadcast a new instance of the subscribe SDF (e.g., signal 1182) with originating node 1101b's MAC address and a hop count set to 1. In response, node 1101c may send a solicited publish SDF (e.g., signal 1183) to node 1101a that may include device information for node 1101c. Node 1101a may send a follow up SDF (e.g., signal 1184) to node 1101b including the device information for node 1101c, and including a hop count associated with node 1101c set to 1, according to some embodiments. Thus, as described above, node 1101c may update device information for either/both of nodes 1101a and 1101b, and nodes 1101a and 1101b may update device information for node 1101c. Note that with regard to node 1101a, node 1101b is both an originating and triggering node.

Since node 1101c is also a beaconing master node, node 1101c may broadcast a new instance of the subscribe SDF (e.g., signal 1185) with originating node 1101b's MAC address and a hop count set to 2. In response, node 1101d may send a solicited publish SDF (e.g., signal 1186) to node 1101c that may include device information for node 1101d. Node 1101c may send a follow up SDF (e.g., signal 1187) to node 1101a including the device information for node 1101d, and including a hop count associated with node 1101d set to 1, according to some embodiments. Note that with regard to node 1101c, node 1101b is an originating node and node 1101a is a triggering node. In response to the follow up SDF (e.g., signal 1187) from node 1101c, node 1101a may send an additional follow up SDF (e.g., signal 1188) to node 1101b including the device information for node 1101d, and including a hop count associated with node 1101d incremented by a count of 1, according to some embodiments. For example, the hop count associated with node 1101d may be set to 2. Thus, as described above, node 1101d may update device information for any/all of nodes 1101a, 1101b and 1101c, and any/all of nodes 1101a, 1101b, and 1101c may update device information for node 1101d.

In addition, both node 1101a and 1101c may forward a subscribe SDF (e.g., signals 1195 and 1193) to node 1101i, and node 1101i may send a solicited publish SDF (e.g., signals 1196 and 1194) to both nodes 1101a and 1101c. Each of nodes 1101a and 1101c may use the SDF received from node 1101i to update their respective routing tables. However, since node 1101i can be reached by node 1101b via either node 1101a or 1101c, node 1101b may determine a smallest hop count for node 1101i when updating its routing table. Thus, since a route via node 1101a results in fewer hops than a route via node 1101c, node 1101b may enter node 1101i with a next hop of node 1101a and a hop count of 2. Note that node 1101i may not become a forwarding node if it receives a subscribe SDF with a hop count to the originator node that is greater than or equal to a hop count to the originator node maintained in the originator node's route table.

In some embodiments, a forwarding node may use a hop count carried in a subscribe SDF's service information from a triggering node and increment the hop count by 1 before broadcasting a new instance of the subscribe SDF. Additionally, in some embodiments, a beaconing node, upon reception of a follow up SDF, may use a hop count carried in the follow up SDF's service information field and increment it by 1 before creating a route entry in the beaconing node's route table and/or forwarding the follow up SDF on to the beaconing node's triggering node.

In some embodiments, to facilitate routing with 802.11 frames, an address field (of an SDF) may include any/all of a source address (originator), a destination address (ultimate destination), a transmitter address (intermediate transmitter), and/or a receiver address (intermediate receiver). In order to accommodate the additional addresses, a four address MAC header may be utilized, such as an 802.11 wireless distribution system (WDS) frame format. Alternatively, a subnetwork access protocol (SNAP) header may be utilized in conjunction with a traditional three address 802.11 MAC header. In such embodiments, the SNAP header may include the destination and source addresses. As another alternative, an aggregated MAC service data unit (A-MSDU) frame format may be utilized. In such embodiments, an MSDU within the A-MSDU may carry the source and destination addresses, whereas the address1 and address2 in the A-MSDU 802.11 frame may carry the transmitter and receiver addresses.

In some embodiments, fine timing measurement (FTM) protocol may be utilized to determine relative distances between each node. Alternatively, relative distances may be determined using methods as disclosed in U.S. Provisional Patent Application No. 62/149,801 filed Apr. 20, 2015, now U.S. patent application Ser. No. 15/131,911 filed Apr. 18, 2016, both of which are hereby incorporated by reference in their entirety as though fully and completely set forth herein. In some embodiments, peer distances may be used in a NAN cluster mapping to position (or locate) NAN nodes accordingly with respect to other NAN nodes. Additionally, location information from discovered NAN nodes may be used as a metric for NAN node placement in the NAN cluster mapping.

In some embodiments, an originating node may request discovery of non-Wi-Fi technology devices from remote NAN nodes. For example, node 1101b may request discovery of non-Wi-Fi (e.g., Bluetooth) nodes (devices). In such a case, node 1101e may report the presence of non-Wi-Fi node 1101j and node 1101c may report the presence of non-Wi-Fi nodes 1101k and 1101n. Note that nodes 1101c and 1101e may be multi-mode devices supporting both Wi-Fi and non-Wi-Fi communications. In such embodiments, the originating node may learn a route to the non- Wi-Fi device. Also, one or more services offered by the non-Wi-Fi devices may be reported back to the originating node.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   a first wireless interface and a second wireless interface, each configured to perform wireless communications; and
   at least one processor communicatively coupled to one or more radios, wherein the one or more radios are associated with the first and second wireless interfaces;
   wherein the at least one processor is configured to cause the wireless station to:
      detect neighboring wireless stations that are configured to perform Wi-Fi communication, wherein the wireless station and the neighboring wireless stations are associated with a device cluster;
      transmit a subscribe service discovery frame (SDF) to the neighboring wireless stations, wherein the subscribe SDF includes a parameter requesting discovery of neighboring non-Wi-Fi wireless stations;
      receive respective publish SDFs from the neighboring wireless stations, wherein a respective publish SDF includes respective device information for a neighboring wireless station, wherein the respective device information includes a hop count parameter for the neighboring wireless station, and wherein the hop count parameter indicates a number of neighboring wireless stations between the wireless station and the neighboring wireless station;
      receive a follow-up SDF, wherein the follow-up SDF includes services offered by a neighboring non-Wi-Fi wireless station; and
      maintain a data structure containing mapping information for devices in the device cluster and a route to the neighboring non-Wi-Fi wireless station, wherein the data structure comprises the respective device information received from the neighboring wireless stations.

2. The wireless station of claim 1,
   wherein the subscribe SDF includes an address of the wireless station;
   wherein the respective device information includes an address of the neighboring wireless station; and
   wherein the data structure includes the address.

3. The wireless station of claim 1,
   wherein the at least one processor is further configured to cause the wireless station to:
      receive at least one follow up SDF from at least one neighboring wireless station of the neighboring wireless stations, wherein the follow up SDF includes device information for at least one wireless station not discoverable by the wireless station, and wherein the data structure further comprises the device information for the at least one wireless station not discoverable by the wireless station.

4. The wireless station of claim 3,
   wherein the subscribe SDF includes an address of the wireless station;
   wherein the respective device information includes an address of the at least one neighboring wireless station;
   wherein the at least one follow up SDF includes an address of the at least one wireless station; and
   wherein the data structure includes the address of the at least one neighboring wireless station and the address of the at least one wireless station.

5. The wireless station of claim 1,
   wherein the at least one processor is further configured to cause the wireless station to:
      receive a follow-up SDF, wherein the follow-up SDF includes device information regarding a neighboring non-Wi-Fi wireless station.

6. The wireless station of claim 1,
   wherein the neighboring non-Wi-Fi wireless stations comprise Bluetooth wireless stations.

7. The wireless station of claim 1,
   wherein the subscribe SDF further includes configuration parameters comprising one or more of:
      a subscribe type attribute;
      a time to live attribute;
      a discovery range attribute; or
      a query period;
   wherein the subscribe type attribute indicates whether the subscribe is an active subscribe or a passive subscribe; and
   wherein the query period is specified in terms of discovery windows.

8. The wireless station of claim 1,
   wherein the follow up SDF further comprises the route to the neighboring non-Wi-Fi wireless station.

9. An apparatus, comprising:
   a memory; and
   a processing element in communication with the memory, wherein the processing element is configured to:
      receive a first subscribe service discovery frame (SDF) from a first neighboring wireless station, wherein the first subscribe SDF includes first device information regarding the first neighboring wireless station, wherein the first device information includes a first hop count parameter for the first neighboring wireless station, wherein the hop count parameter indicates a number of wireless stations between the apparatus and the first neighboring wireless station, and wherein the first subscribe SDF includes a parameter requesting discovery of neighboring non-Wi-Fi wireless stations;

receive a second subscribe SDF from a second neighboring wireless station, wherein the second subscribe SDF includes second device information regarding the second neighboring wireless station, wherein the second device information includes a second hop count parameter for the second neighboring wireless station, wherein the first and second neighboring wireless stations are associated with a device cluster;

generate instructions to transmit a first publish SDF to the first neighboring wireless station, wherein the publish SDF includes a device address and services offered by a neighboring non-Wi-Fi wireless station; and maintain a data structure containing the first and second hop count parameters, wherein the data structure includes mapping information for devices in the device cluster and a route to the neighboring non-Wi-Fi wireless station.

10. The apparatus of claim 9,
wherein the processing element is further configured to:
generate instructions to transmit a second publish SDF to a third neighboring wireless station, wherein the second publish SDF includes the first device information regarding the first neighboring wireless station and the second device information regarding the second neighboring wireless station.

11. The apparatus of claim 10,
wherein the processing element is further configured to:
receive a third subscribe SDF from the third neighboring wireless station, wherein the third subscribe SDF includes third device information regarding the third neighboring wireless station.

12. The apparatus of claim 11,
wherein the processing element is further configured to:
generate instructions to transmit a follow up SDF to the first neighboring wireless station, wherein the follow up SDF includes the third device information regarding the third neighboring wireless station.

13. The apparatus of claim 11,
wherein the data structure further comprises the third device information.

14. The apparatus of claim 9,
wherein the publish SDF further includes configuration parameters comprising one or more of:
a publish type attribute;
a time to live attribute;
a discovery range attribute; or
an event condition attribute;
wherein the publish type attribute indicates whether the publish is a solicited publish or an unsolicited publish; and
wherein the query period is specified in terms of discovery windows.

15. The apparatus of claim 9,
wherein the processing element is further configured to:
generate instructions to transmit a follow-up SDF, wherein the follow-up SDF includes services offered by a neighboring non-Wi-Fi wireless station.

16. A non-transitory computer readable memory medium storing program instructions executable by a processor of a wireless station to:
generate instructions to transmit a first service discovery frame (SDF) to a first neighboring wireless station, wherein the wireless station and the first neighboring wireless station are associated with a device cluster, and wherein the first SDF includes a parameter requesting discovery of neighboring non-Wi-Fi wireless stations;
receive a second SDF from the first neighboring wireless station, wherein the second SDF includes first device information and services offered by a neighboring non-Wi-Fi wireless station, the first device information comprising a first hop count parameter and first address associated with the first neighboring wireless station, and wherein the hop count parameter indicates a number of neighboring wireless stations between the wireless station and the first neighboring wireless station; and
maintain a data structure containing mapping information for devices in the device cluster, wherein the data structure comprises the first device information and a route to the neighboring non-Wi-Fi wireless station.

17. The non-transitory computer readable memory medium of claim 16,
wherein the program instructions are further executable by the processor to:
receive a follow up SDF from the first neighboring wireless station, wherein the follow up SDF includes second device information comprising a second hop count parameter and second address associated with a second neighboring wireless station.

18. The non-transitory computer readable memory medium of claim 17,
wherein the data structure further comprises the second device information.

19. The non-transitory computer readable memory medium of claim 16,
wherein the program instructions are further executable by a processor to:
receive a follow-up SDF, wherein the follow-up SDF includes device information regarding a neighboring non-Wi-Fi wireless station.

20. The non-transitory computer readable memory medium of claim 16,
wherein the program instructions are further executable by the processor to:
generate instructions to transmit a third SDF to a second neighboring wireless station associated with the device cluster, wherein the third SDF includes a second hop count parameter and the first address associated with the first neighboring wireless station, and wherein the second hop count parameter is an increment of the first hop count parameter.

* * * * *